Nov. 25, 1930.  D. H. STOKES  1,782,636
ELECTRICALLY OPERATED LAWN MOWER
Filed Sept. 7, 1927  2 Sheets-Sheet 1
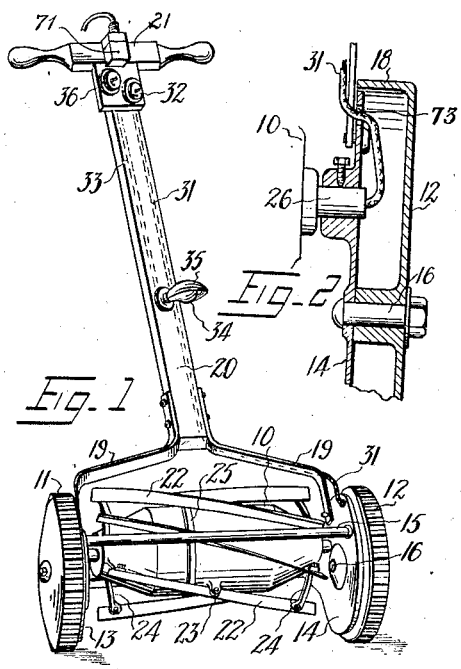
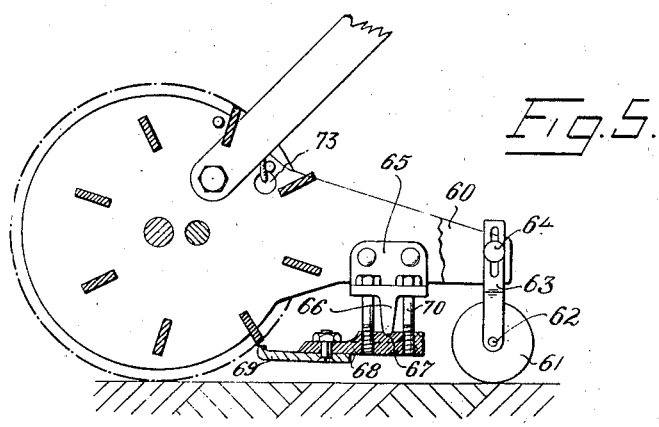
D. H. Stokes
INVENTOR
By Marks & Clerk
Attys.

Nov. 25, 1930.                D. H. STOKES                 1,782,636
                   ELECTRICALLY OPERATED LAWN MOWER
                      Filed Sept. 7, 1927      2 Sheets-Sheet 2

D. H. Stokes
  INVENTOR

By Marks & Clerk
        Attys.

Patented Nov. 25, 1930

1,782,636

UNITED STATES PATENT OFFICE

DOUGLAS HENRY STOKES, OF CREMORNE, NEAR SYDNEY, NEW SOUTH WALES, AUSTRALIA

ELECTRICALLY-OPERATED LAWN MOWER

Application filed September 7, 1927, Serial No. 218,068, and in Australia September 20, 1926.

This invention relates to mowers for cutting and trimming tennis lawns and other grass plots.

The essential feature of it is the housing of an electric motor for direct or geared drive within a rotatable carrier which is armed with a gang of cutters fixed on it; these cutters coact with a fixed knife in the usual manner.

Mowers thus constructed are primarily usable for cutting grassed lawns and banks; in small dimensions they are adaptable for trimming the borders of grassed plots, and they are adaptable also for hedge trimming purposes.

In the case of an induction A. C. motor, the motor armature is fixed on the interior of the barrel surrounding the field, and the field is built on a fixed spindle upon which the cutter barrel is rotatable. Direct drive is thus obtained. In the case of a D. C. motor or a universal motor, the armature is by preference spur geared to an internal ring gear fixed in the barrel, and the field is built in a frame having tubular ends upon which the barrel is rotatable. Gear drive is thus obtained. But the armature might be directly attached to the barrel. The assembly is in either case supported on ground wheels, and the frame which carries the ground wheel axles also carries the rotor shaft, the adjustably fixed knife blade with which the cutters coact, and it also carries the usual ground roller.

In the accompanying drawing:—

Fig. 1 is a perspective view of the machine;

Fig. 2 is a fragmentary vertical section through portion of one of the ground wheels and one cheek of the frame, showing the ground wheel axle, the barrel mounting, the leading-in wiring, and one end of the handle yoke;

Fig. 5 is a sectional elevational view showing one of the cheek frames, the ground roller, the fixed knife blade and its adjustments, and other parts of the assembly.

Figure 3:
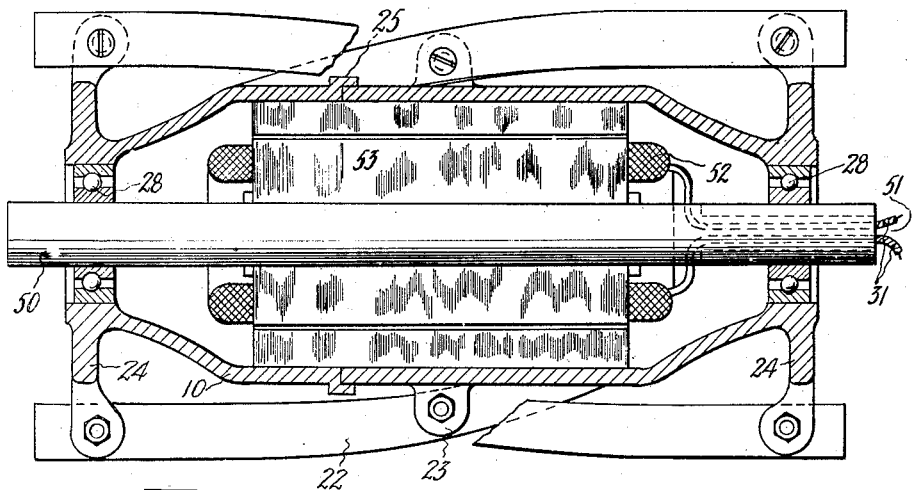
Fig. 3 is a longitudinal section through the cutter of a direct driven slow speed motor assembly.

In Fig. 3, 22 are the helically twisted cutter blades which are fixed on lugs 23 and 24 on the exterior of a barrel 10, and 50 is a shaft which is fixed at its ends in the mower frame as seen at 26 Fig. 2. 52 is the armature, 53 the field, and 31 circuit wires from the field led out through a hole 51 drilled through one end of the shaft 50. 28 are ball bearings which carry the barrel 10 rotatably on the fixed shaft 50.

Figure 4:
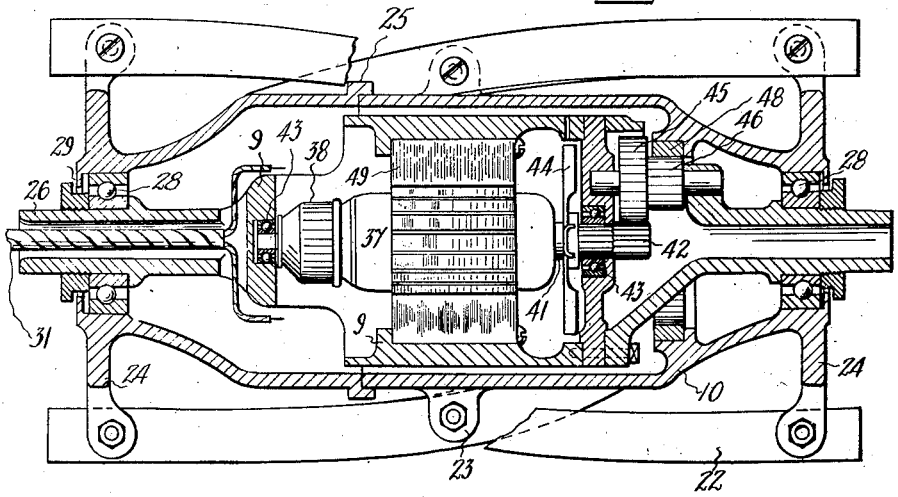
Fig. 4 is a similar section through the cutter and motor assembly of a machine operatable by a high speed geared motor.

In Fig. 4, 22 are the helically twisted cutter blades which are fixed on lugs 23 and 24 on the exterior of the barrel 10. The barrel is rotatably mounted on ball bearings 28 on the tubular ends 26 of a frame 9 within the barrel 10. 49 is the field and 37 is the armature. The armature spindle 41 is double geared down through the wheel train 42—45—46 to an internal gear ring 48 which is fixed in the barrel 10. The circuit connections 31 are led in to the motor brushes (not shown) through one of the tubular ends 26 of the frame 9. The barrel 10 is constructed in two parts suitably connected at 25 and secured together, to facilitate the assembling of the parts within them. 43 are ball bearings carrying the shaft of the armature 37, and 38 is the commutator. 44 are blower vanes which maintain a little air circulation, and help to maintain a cool condition in the motor. The field frame 9 is built up at one end and fitted together by screw pins as shown. This arrangement facilitates assembly.

The ground wheels 12 run freely on fixed stub axles 16. These axles are set in the cheek pieces 14. The cheek pieces are provided with rearwardly extending wing members 60. The ground roller 61 runs freely on pin axles 62 carried in bracket members 63 fixed adjustably for height on the wing members 60 by means of screw pins 64, or otherwise. The wing members 60 also carry offset lugs 65. These lugs are formed with depending fingers 66 which inset into footstep holes 67 in the rib plate 68 to which the fixed knife 69 is fixed by screws. The rib plate 68 is held up to the lugs 65 by bolts 70 and the knife structure thus forms a cross-member of the frame; these bolts permit rocking adjustment about the footsteps 67 to enable the setting of the clearance between the edge of the fixed blade 69 and the edges of the helical blades 22 on the barrel.

The reaction component of the torque exerted by the motor is taken by the ground roller 61, and by height adjustment of this roller the closeness of the cut made by the machine can be regulated. The lead lines 31 are suitably encased where exposed. They are carried through the clearance space within the wheel and out through eye holes 73 in the cheek plates 14, and thence upwardly along the handle 20 to a control switch 32. The switch 32 may be mounted in any conveniently accessible position.

To enable the machine to be used at night a lamp 34 fitted with a back reflector 35 which acts also as a protector for it, is fitted on the handle 20. The circuit to this lamp is controlled through the lines 33 by a switch 36. Current is carried to the switches 32 and 36 by means of a twin flexible insulated conductor through a socket plug 71 from any appropriate source of current supply.

In operation, the barrel 10 is rotated by the motor when the switch 32 is closed, and the assembly of helically twisted blades 22 is thus revolved in operative relation to the fixed knife 69 whilst the machine is manually rolled over the sward to be mowed; the yoke 19 of the hand piece 21 swings freely on the trunnion fittings by which it is mounted on the cheeks 14. In night use, the switch 36 is closed to procure projection of light from the lamp 34 directly over the machine to illuminate the sward under approach.

The motor parts being completely enclosed in the barrel 10 are secured against injury from external causes, and a simple rugged construction is obtained. Inertia of the rotating barrel 10 maintains uniformity in the cutting operation, making good any tendency to slow up when the machine is driven through heavy growth, or when it encounters twigs, bones, or other foreign substances.

It is not essential that a closed barrel be used as a carrier and housing for the motor, though in practice a barrel would be used for that purpose in order to protect the motor from mechanical injury and to keep it dry. It is, however, desirable to provide gauze-filled air vents through the barrel sides to permit air circulation for cooling purposes.

What I claim as my invention and desire to secure by Letters Patent is:—

1. A mower comprising a wheeled frame having a shear knife adjustably fixed across the lower part of it and a horizontal shaft fixed across it above said shear knife, a carrier mounted for rotation on said shaft, an electric motor housed within said carrier with its fixed element secured to said shaft and its rotative element geared to said carrier, a plurality of helically twisted cutter blades fixed on said carrier and adapted to coact with said shear knife, a handle pivotally connected to said frame, insulated flexible wires led out from the motor through an end of said shaft and thence to a switch, and means for connecting said wires to a flexible twin cable.

2. A mower comprising a frame having rearwardly winged cheek plates, stub axles on said cheek plates, wheels freely rotatable on said axles with annular clearance between their sides and said plates, a ground roller rotatable in bearings in the wing parts of said plates, a handle having a yoke foot secured to said cheek plates, cross members connecting said cheek plates including a shear knife and a shaft, an assembly of helically twisted cutter blades disposed on a substantially closed barrel which is mounted for rotation on said shaft and arranged in operative shearing relation to said knife, an electric motor within said barrel having one of its elements associated with said barrel and the other element fixed on said shaft, a switch on the handle, and leads from the motor winding terminals brought out through the shaft end into said clearance space and carried through an aperture in one of said cheek plates and continued along the handle to said switch.

In testimony whereof I affix my signature.
DOUGLAS HENRY STOKES.